(12) United States Patent
Winje et al.

(10) Patent No.: US 8,032,935 B2
(45) Date of Patent: Oct. 4, 2011

(54) SECURITY SYNCHRONIZATION SERVICES (75) Inventors: Paul Winje, Fargo, ND (US); Michael J. Isley, Fargo, ND (US); Grant Eric Swenson, Fargo, ND (US); Brian Keith Gullickson, Hudson, WI (US)

(73) Assignee: Microsoft Corporation, Redmond, WA (US)

( * ) Notice: Subject to any disclaimer, the term of this patent is extended or adjusted under 35 U.S.C. 154(b) by 851 days.

(21) Appl. No.: 11/771,574

(22) Filed: Jun. 29, 2007

(65) Prior Publication Data
US 2009/0007260 A1 Jan. 1, 2009

(51) Int. Cl.
G06F 7/04 (2006.01)

(52) U.S. Cl. ............... 726/19; 726/16; 726/17; 726/18; 726/20; 726/21

(58) Field of Classification Search ............... 726/16–21
See application file for complete search history.

(56) References Cited

U.S. PATENT DOCUMENTS

| | | | |
|---|---|---|---|
| 5,911,143 A | 6/1999 | Deinhart et al. | |
| 6,055,637 A | 4/2000 | Hudson et al. | |
| 6,453,353 B1 | 9/2002 | Win et al. | |
| 6,574,736 B1 | 6/2003 | Andrews | |
| 6,985,955 B2 | 1/2006 | Gullotta et al. | |
| 7,131,000 B2 | 10/2006 | Bradee | |
| 7,523,486 B1 * | 4/2009 | Turner | 726/2 |
| 2004/0093526 A1 | 5/2004 | Hirsch | |
| 2004/0205749 A1 * | 10/2004 | Dalton et al. | 717/178 |
| 2005/0202392 A1 * | 9/2005 | Allen et al. | 434/362 |
| 2005/0257197 A1 | 11/2005 | Herter et al. | |
| 2007/0038642 A1 | 2/2007 | Durgin et al. | |
| 2007/0056026 A1 | 3/2007 | Britton et al. | |
| 2007/0079384 A1 * | 4/2007 | Grinstein | 726/27 |
| 2007/0198522 A1 * | 8/2007 | Britton et al. | 707/9 |
| 2008/0016580 A1 * | 1/2008 | Dixit et al. | 726/27 |
| 2008/0244736 A1 * | 10/2008 | Lampson et al. | 726/21 |

OTHER PUBLICATIONS

Roeckle, et al., "Process-Oriented Approach for Role-Finding to Implement Role-Based Security Administration in a Large Industrial Organization," http://www.roeckle.de/downloadables/acm-rbac2000-neu-05.pdf.

Nagaratnam et al., "Business-driven application security: From modeling to managing secure applications," IBM Systems Journal, vol. 44, No. 4, 2005, http://www.researchibm.com/journal/sj/444/nagaratnam.pdf.

Barkley et al., "Supporting Relationships in Access Control Using Role Based Access Control," 1999, http://delivery.acm.org/10.1145/320000/319177/p55-barkley.pdf?key1=319177&key2=3033615711&coll=Guide&dl=Guide&CFID=14972712&CFToken=78382301.

* cited by examiner

*Primary Examiner* — Nabil El Hady (57) ABSTRACT

As a result of the inability to assign security in multiple applications at one time, there is an opportunity to tie the disparate security systems together. Security synchronization services is a method and apparatus that uses roles to provide a common administration experience for all applications that use it and fits better for new applications.

20 Claims, 4 Drawing Sheets

SECURITY SYNCHRONIZATION SERVICES

BACKGROUND

This Background is intended to provide the basic context of this patent application and it is not intended to describe a specific problem to be solved.

Today, users are faced with the task of setting up security in multiple applications, most of which have a different security infrastructure and administration experience. This task can be daunting and frustrating. As more applications are integrated, it will become increasingly important that users are provided a way to "hook all the applications up" so that the applications work as expected. It is unrealistic to expect administrators to manually set up, modify or remove security in every application for every user. It also is unrealistic to expect all applications to "snap" to a common security infrastructure as most popular the applications that are integrated are already mature applications with an established security infrastructure

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

As a result of the inability to assign security in multiple applications at one time, there is an opportunity to tie the disparate security systems together. The disclosed method and apparatus provides a common administration experience for all applications that use it and fits better for new applications by using roles to assign security. The utility will provide the following capabilities:

The ability to synchronize role membership between disparate applications;
 The ability to go to one place and add a user to multiple roles in multiple applications at the same time, in one administration experience;
 The ability to plug new providers in such that new applications can easily plug and play if they can support the required interfaces; and
 The ability to remove a user from multiple applications The disclosed method and apparatus provides the ability to synchronize in any direction by specifying a source and destination, along with some rules about what should happen along the way. The actual work of adding/removing users from roles is the responsibility of the providers that are plugged in to the method, providing extensibility for any application or security infrastructure that can be programmatically accessed via some application programming interface.

DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
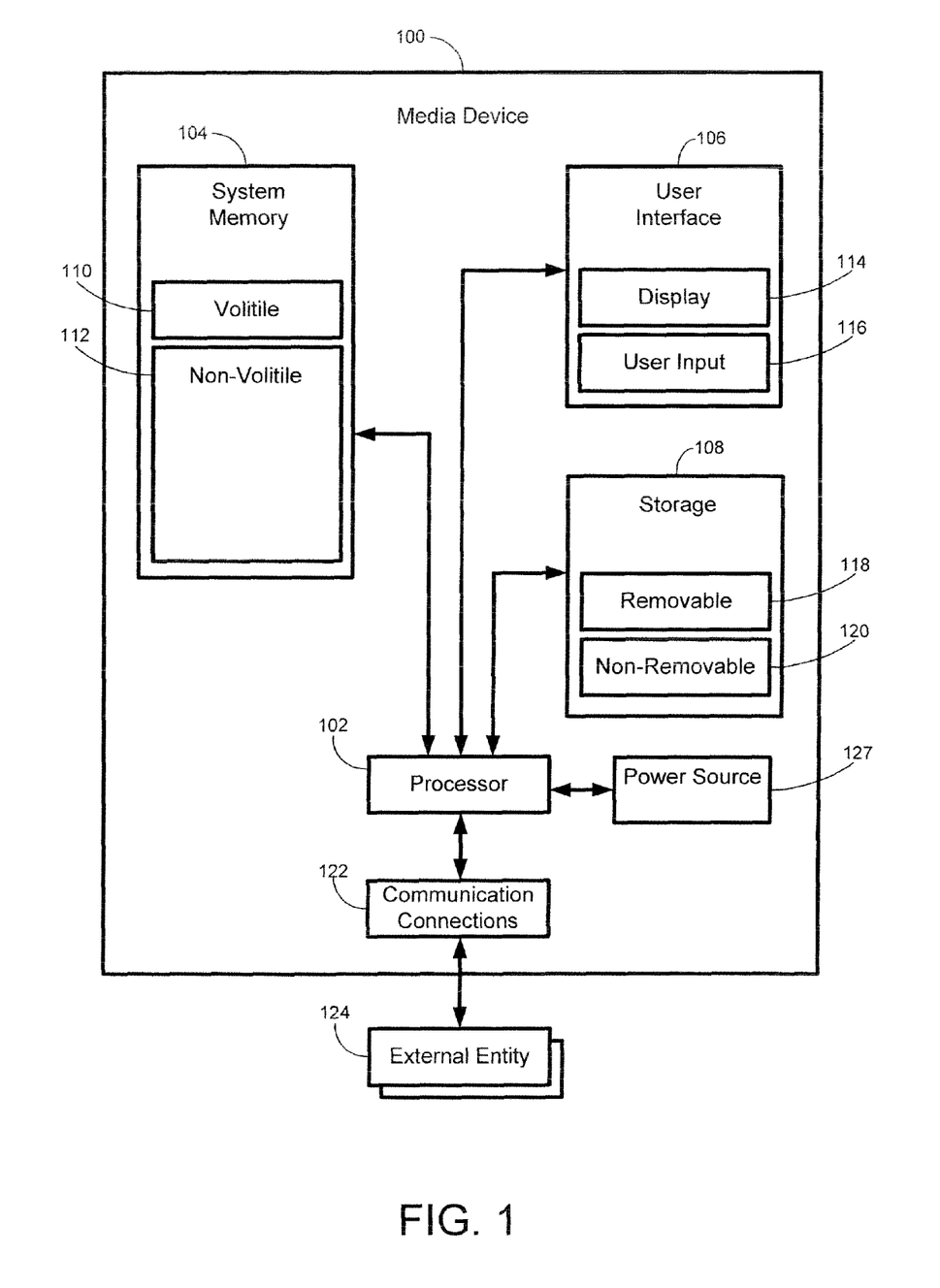
FIG. 1 is an illustration an illustration of exemplary hardware that is used for a computing device to implement security synchronization services.

FIG. 1 is an illustration of exemplary hardware that may be used for a computing device to implement the method described herein. The device 100 may have a processing unit 102, a memory 104, a user interface 106, a storage device 108 and a power source 127. The memory 104 may include volatile memory 110 (such as RAM), non-volatile memory 112 (such as ROM, flash memory, etc.) or some combination of the two or any other form of storage device The device 100 may also include additional storage 108 (removable and/or non-removable) including, but not limited to, magnetic or optical disks or tape or any other memory. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data.

The processing unit 102 may be any processing unit 102 capable of executing computer code. When in a portable device, it may also be useful if the processor 102 is efficient in using power to increase the life of the power source. The processing unit 102 may also be used to execute code to support a user interface and external communications.

The display 114 may be a color LCD screen or any other appropriate display 114. User input(s) 116 may include a keyboard, manual buttons, soft buttons, or a combination of both. In addition, the user input may be gesture driven which may use no buttons or may be voice activated. Soft buttons may be used when the display 114 includes a touch screen capability. Manual buttons may include re-definable keys with programmable legends. In operation, a user may use the user interface to select an application.

The media 100 may also contain communications connection(s) 122 that allow the device 100 to communicate with external entities 124, such as network endpoints or a computer used for synchronization. Communications connection(s) 122 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media The power source may be a battery that may be rechargeable. The power source may also be a standard battery or an input from a power converter or any other source of power.

At a high level, the described method may be exposed via console such as a Microsoft Management Console which communicates with a synchronization web service use a web services protocol. The console may provide the ability to synchronize in any direction by specifying a source and destination, along with some rules about what should happen along the way. The actual work of adding/removing users from roles would be the responsibility of the providers that are plugged in, providing extensibility for any application or security infrastructure that can be programmatically accessed via some application programming interface.

Figure 2:
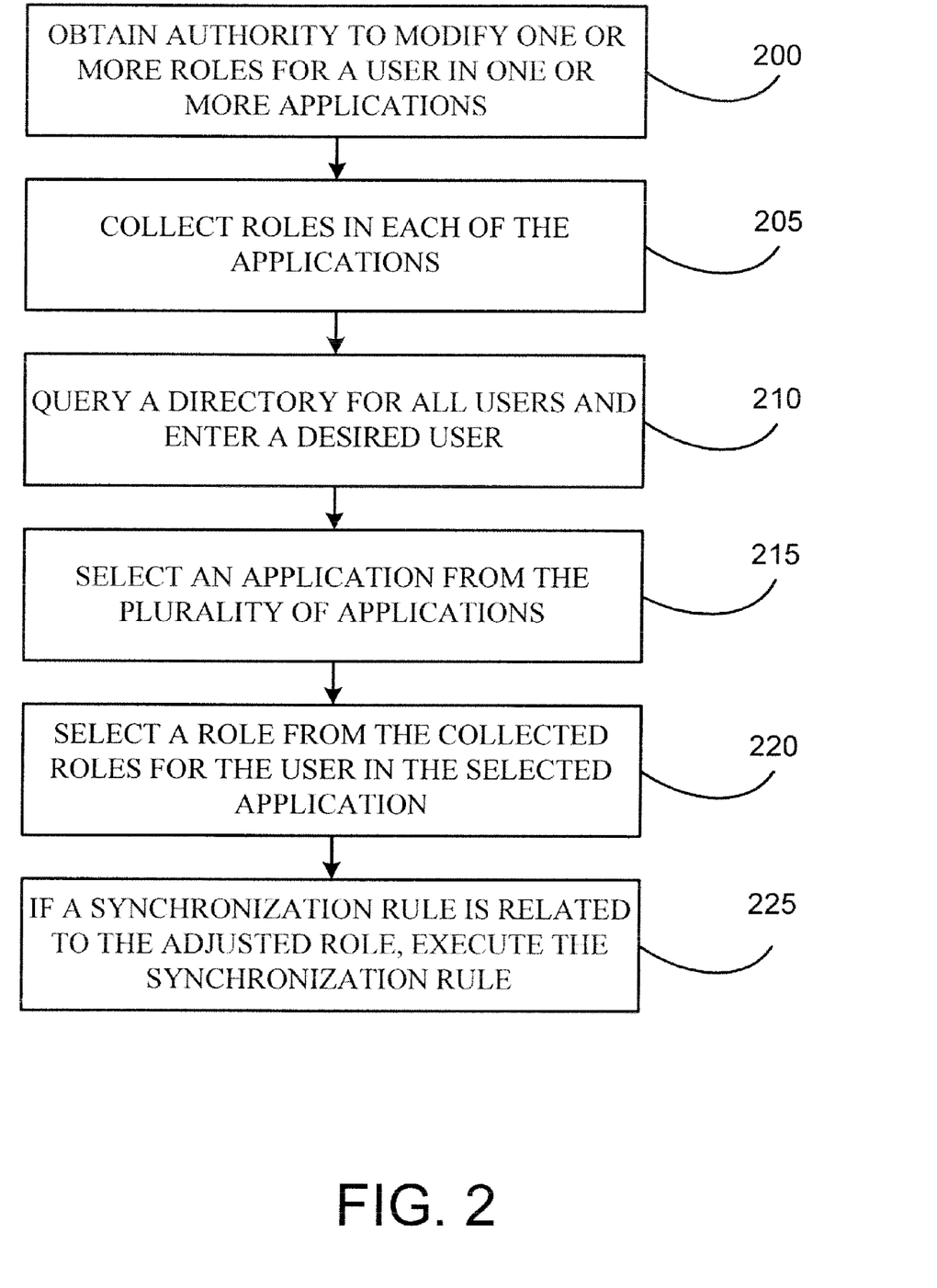
FIG. 2 is an illustration of a method of synchronizing security settings across a plurality of computer applications.

FIG. 2 is an illustration of a method of synchronizing security settings across a plurality of computer applications. As a result of the inability to assign security in multiple applications at one time, there is an opportunity to tie the disparate security systems together with the described method. The method may allow an administrator to synchronize role membership between disparate applications, go to one place and add a user to multiple roles in multiple applications at the same time, in one administration experience, plug new providers in such that new applications can easily plug and play if they can support the required interfaces and the ability to remove a user from multiple applications.

At block 200, authority may be obtained to modify one or more roles for a user in one or more applications. In most networks, an administrator has the needed authority. A security role can be thought of as a privilege granted to users or groups based on specific conditions. In addition, in some cases, the roles in the applications may have to be further defined. For example, role specific permissions may have to be set for roles in each application.

At block 205, roles in each of the applications may be collected. The roles may be collected by calling an API or other function designed for this purpose. Some applications may be prepared to respond and some may not. If an application does not have roles or does not have the necessary knowledge to respond, that application will be unable to be synchronized without additional effort on the part of the administrator.

At block 210, a directory may be queried for all users and the user may be selected from the found users. In some cases, the user in question may already be known and may be directly entered. The scope of the inquiry may be limited to a specific group in question or may be network wide.

At block 215, an application may be selected from the plurality of applications. In some embodiments, the application may known and entered immediately. The applications may be obtained through a survey or through a directory.

At block 220, a role from the collected roles for the user may be selected in the selected application. The adjustment may be one of grant, change or remove. On one embodiment, the role for multiple users may be adjusted at the same time. In another embodiment, the user may be added to the roles of another user. For example, if Employee A is an accounts payable clerk and Employee B is a new accounts payable clerk, the roles (and related security settings) may be copied from Employee A to Employee B.

In some applications, roles are further broken down into scopes. Accordingly, the method may obtain a scope of the roles from the application. If the application supports scope specific roles, the scope specific roles may be adjusted for the user.

At block 225, if a synchronization rule is related to the adjusted role, the synchronization rule (or rules) may be executed. A synchronization rule adjusts a role for the user in one or more additional applications. More specifically, a rule may be created that if the user is assigned a role in a first application, a known role may be assigned in a second application.

Figure 3:
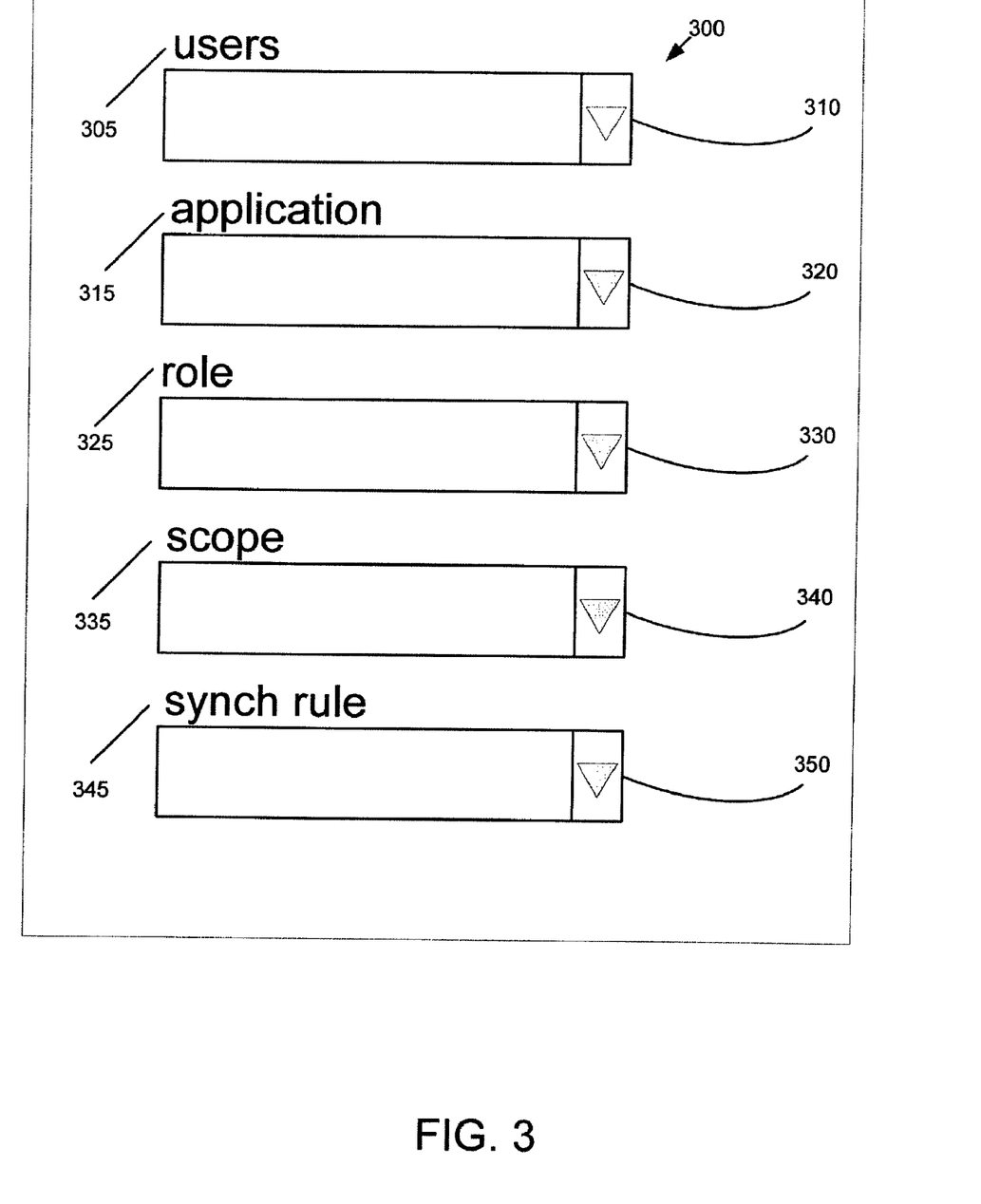
FIG. 3 illustrates a user interface for a method of synchronizing security settings across a plurality of computer applications.

FIG. 3 may illustrate a user interface 300 for a method of synchronizing security settings across a plurality of computer applications. Similar to FIG. 2, a directory of all users 305 may be displayed. The users may be displayed in any manner such as in a drop down box 310 and in the cases when the user is known, the user may be directly entered. An option may be displayed to select multiple users 305 and adjust the role for selected multiple users at the same time.

A list of applications also may be displayed 315. An application selection interface 320 may be displayed such as a drop down box where an application may be selected from the displayed list of applications.

A list of roles 325 in the application 3315 may be displayed. A role selection interface 330 may be displayed where a role 325 is selected from the displayed list of roles 325 for the selected user 305. The interface may be a simple drop down box or may be an entirely new display. By selecting a role, the selected role 325 for the user in the selected application 315 may be adjusted. The adjustments may be to add a role, remove a role, up-grade a role, down-grade a role, or simple change of a role. An option may be displayed to add the selected user to the roles of another user.

If the application supports scope specific roles, a scope 335 of the roles 325 from the selected application may be displayed. A scope of roles selection interface 340 may be displayed where a scope 335 selected from the displayed scopes 335 may adjust the scope 335 specific roles 325 for the selected user 305. The interface may be a simple drop down box or may be an entirely new display.

The interface 300 may display synchronization rules 345 that may be related to the role 325 selected. A rule synchronization interface 350 may be displayed where the synchronization rule 345 is selected to be executed. The interface may be a simple drop down box or may be an entirely new display. There also may be an option to create a new rule 355.

Figure 4:
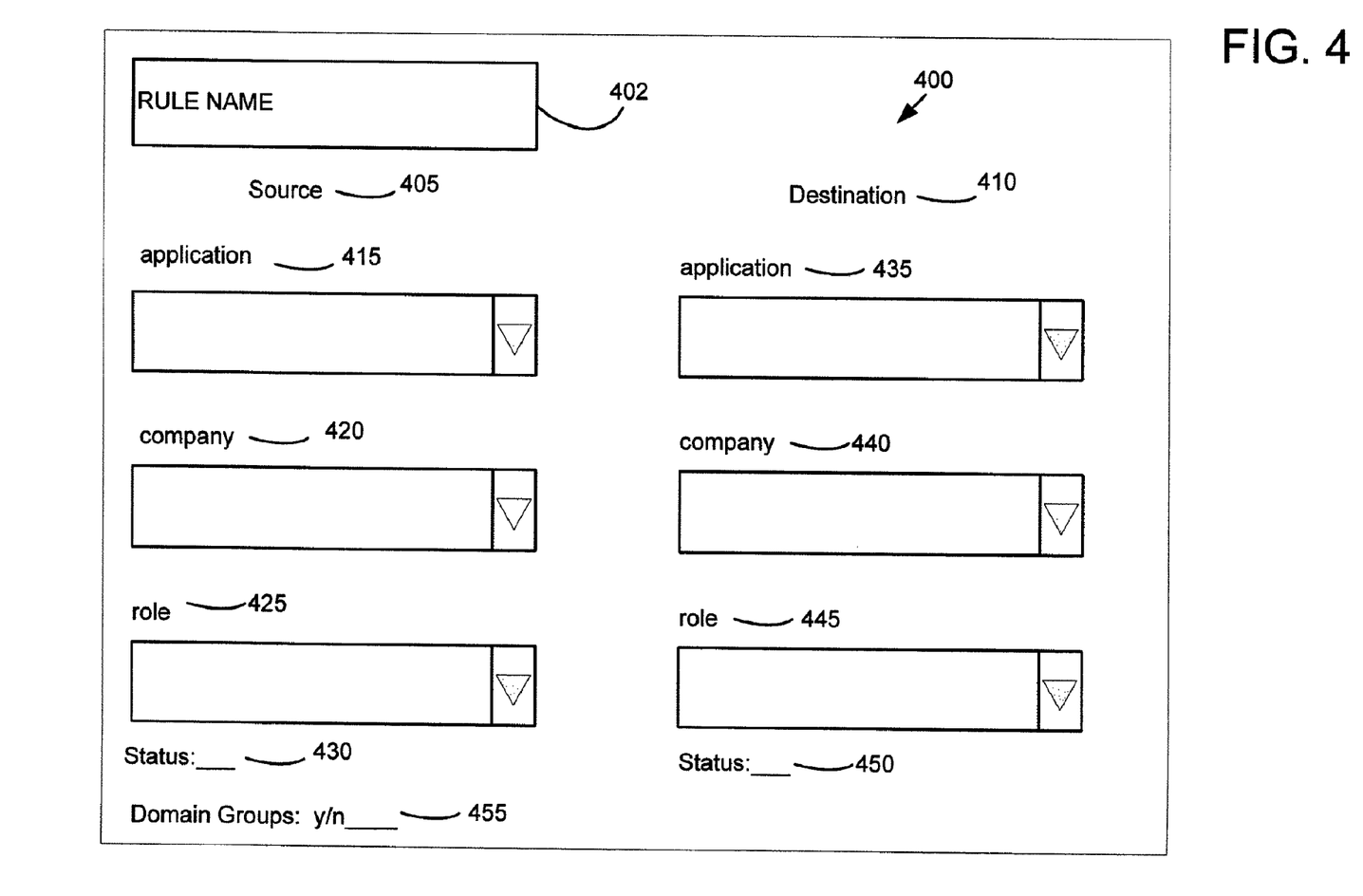
FIG. 4 illustrates a user interface 400 for creating a new security synchronization rule.

FIG. 4 may illustrate a user interface 400 for creating a new rule. A role may have a name 402 and the name made be entered or selected. On one side of the interface 400, a source 405 for the information may be selected and on the other side, a destination 410 for the information may be selected. On the source side 405, an application 415 may be selected, a company 420 may be selected and a role 425 may be selected. In addition, a status 430 notice may be displayed. Under the destination 410, an application 435 may be selected, a company may be selected 440 and a role 445 may be selected. In addition, a status notice may be displayed 450. The status notice 430 and 450 may notify the administrator if there are issues in reaching the applications, if proper authority is not present, if authorization failed, etc. In addition, an option may be displayed to synchronize 455 individual domain group users. This option may be used when a source application supports the use of domain groups as members but the destination application does not.

To make the method and apparatus work, in one embodiment, framework such as .NET from Microsoft ® and an application that defines the concept of application providers. A main class may be used that defines the interface between the generic subsystem and the specific application role providers. The application role providers may have to implement the main class for the application to be able to be part of a security synchronization method. The class may have properties such as id, name and unsupported entities. The class may have methods such as GetRoles, GetScopes, DeleteRoleAssignment, CreateRoleAssignment, GetSupportedOptions, RemoveApplicationROleAssignment and GetAuditingInformation. Registering with the method may involve deriving an abstract framework class that requires an application provider to implement the methods. These methods may allow the method to retrieve role information from an application, persist role information to an application and provide a host of additional functionality across the applications without knowing any specific implementation details about the application's authorization framework.

If an application supports roles, the application manufacture may "plug in" their security infrastructure by adding an entry that points to their provider assembly to support the described methods. The security synchronization method may then register the provider to be called when the application is launched the next time. By adding a configuration entry to the application's configuration file, an application manufacturer may plug in to the method. The following is sample code that might be in the configuration file:

```
<?xml version="1.0" encoding="utf-8" ?>
<configuration>
    <appSettings>
        <add key ="applicationRoleProviders" value =
"greatPlainsWebServicesProvider,businessPortalProvider,dynamicsGpProvider,mbfProvider"
/>
        <add key ="applicationRoleProvidersInvalidIdentities" value = "" />
        <add key ="greatPlainsWebServicesProvider" value =
"Microsoft.Dynamics.Security.Synchronization,
Microsoft.Dynamics.Security.Synchronization.GreatPlainsWebServiceApplicationRoleProvider"
/>
        <add key ="greatPlainsWebServiceApplicationRoleProviderApplicationKey"
value = "25cc1a21-2cc4-4b13-a1c8-eea186fb688a"/>
        <add key ="greatPlainsAdminSecurityServiceApplicationRoleProviderUrl"
value = "http://localhost/DynamicsAdminService/DynamicsAdminService.asmx" />
        <add key ="greatPlainsWebServicesProviderInvalidIdentities" value = "" />
        <add key ="businessPortalProvider" value =
"Microsoft.Dynamics.Security.Synchronization,
Microsoft.Dynamics.Security.Synchronization.BusinessPortalApplicationRoleProvider" />
        <add key ="businessPortalSharePointUrl" value =
"http://MS1098038/_vti_bin/UserGroup.asmx" />
        <add key ="businessPortalProviderInvalidIdentities" value =
"SHAREPOINT\system" />
        <add key ="dynamicsGpProvider" value =
"Microsoft.Dynamics.Security.Synchronization,
Microsoft.Dynamics.Security.Synchronization.DynamicsGpApplicationRoleProvider" />
        <add key ="dynamicsGpUrl" value =
"http://localhost/GPWebService/DynamicsGPService.asmx" />
        <add key ="dynamicsGpProviderInvalidIdentities" value = "" />
        <add key ="mbfProvider" value =
"Microsoft.Dynamics.Security.Synchronization,
Microsoft.Dynamics.Security.Synchronization.MbfApplicationRoleProvider" />
        <add key ="mbfUrl" value =
"http://MS1098038/BusinessPortal/Portal/Administration/AC_SecurityAdministrator.asmx"
/>
        <add key ="mbfProviderInvalidIdentities" value = "" />
    </appSettings>
    <system.diagnostics>
        <switches>
            <add name="EConnectXMLTraceSwitch" value="3" />
            <add name="ApplicationTraceSwitch" value="1" />
        </switches>
    </system.diagnostics>
</configuration>
```

Each provider is unique and may or may not support all of the same types of functionality of other providers. The following class defines the supported options of a provider and is part of the ApplicationRoleProvider interface. This information allows the user experience to be customized based upon the providers in use and also provides the ability to perform unique validation for each provider.

ApplicationRoleProvider Class
    Properties
    DoesRequireExistingApplicationUser
    DoesSupportDomain Groups
    DoesSupportScopes
    DoesSupportScopeSpecificRoles Providers may be managed by a ApplicationRoleProviderManager class. This class instantiates the registered providers and may perform all of the actual synchronization services between the various application role providers. The ApplicationRoleProviderManager is the primary interface to the user experience portion of the application. It "bootstraps" the system and acts as a ApplicationRoleProvider factory. It also performs functions that cross multiple application role providers.

ApplicationRoleProviderManager Class
    Methods
    GetApplicationRoleProvider
    GetApplicationRoleProviderList
    GetDomainGroups
    GetInstance
    Synchronize Roles
    ValidateSynchronizationRule
    RemoveApplicationRoleAssignment
    GetAuditingInformation
    AddMembersToRoles In some embodiments, the web services protocol is used to interface with the various applications such that the security synchronization method may be available from any machine on a network.

Applications may have a variety of roles and the roles may not match up exactly. Accordingly, rules may be created where if an employee is granted role A in application A, then the employee would be granted role B in application B. These rules may be stored individually or together. The rule files may be stored in any format such as XML.

The following schema outlines a definition of a synchronization rule. These rules may be serialized into something known as rule sets which may be a collection of synchronization rules. These rule sets may be stored in an XML file that can be consumed by the service.

SynchronizationRule Class
    Properties
    Description
    DescriptionApplication
    DestinationApplicationName
    DestinationRole
    DestinationRoleName
    DestinationScope
    DestinationScopeName
    Id
    Name
    Options
    SourceApplication
    SourceApplicationName
    SourceRole
    SourceRoleName
    SourceScope
    SourceScopeName Error checking classes also may be part of the synchronization process. This provides the ability to validate entire objects without returning only the first error found.

As a result of the method and apparatus, the burden on administrators is reduced. All rights are centralized which makes reporting and seeing rights easier. New users may be added and leaving users may be removed in a manner that only requires opening a single application. Similarly, users that have increases or decreases in rights may have the rights modified from a single application.

Let's assume Chris, the IT Administrator, assigned all Accounting Managers rights to the 'Account Manager' role in the Business Portal Administration Console by using the Mass Import of Users functionality. Now let's assume Chris would like to grant all users he imported in the 'Account Manager' role rights to the necessary roles in Share Point so that they can use Business Portal.

Chris opens the Dynamics Synchronization Service Console and selects the Synchronize Roles action. Chris is presented with an option to select a source application and chooses 'BPSDK'. Now, a list of roles appears that are present within the BPSDK application. He selects the 'Account Manager' role and states which company to utilize. He then selects a destination application of 'Share Point' and is presented with a list of roles in that application. He selects the 'Accounting Manager' role and selects the synchronize button. All users present in the source application role are synchronized to the destination role. Also, options are available to delete users if not present in the source application, create new roles in the destination application, etc.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

The invention claimed is:

1. A method of synchronizing role membership within security roles of disparate computer applications, the method comprising:

interfacing, by a management console, with disparate computer applications having different established security infrastructures that support security roles for users, the management console configured to interface with the disparate computer applications via a synchronization web service;

collecting, by the management console, the security roles used in each of the disparate computer applications;

storing, at the management console, synchronization rules for associating collected security roles among the disparate computer applications;

presenting, by the management console, one or more user interfaces for selecting a particular computer application from the disparate computer applications, selecting a particular security role, selecting one or more users to be granted the particular security role, and selecting a synchronization rule that is related to the particular computer application and to the particular security role; and     executing, by the management console via the synchronization web service, a selected synchronization rule that specifies the particular computer application as a source application, specifies a destination application from the disparate computer applications, and associates the particular security role with a collected security role of the destination application;

wherein execution of the selected synchronization rule synchronizes role membership within the particular security role of the particular application specified as the source application and role membership within the collected security role of the destination application.

2. The method of claim 1, further comprising:
obtaining, by the management console, scopes of each of the security roles used in the disparate computer applications if the different established security infrastructures of the disparate computer applications support scope specific security roles for users.

3. The method of claim 1, further comprising:
displaying a directory of all users from which the one more users to be granted the particular security role are selected.

4. The method of claim 1, wherein:
multiple users to be granted the particular security role are selected at the same time, and
execution of the selected synchronization rule adjusts the role membership within the collected security role of the destination application to include the multiple users.

5. The method of claim 1, wherein the one or more user interfaces display a list of all security roles granted to another user for selecting the particular security role.

6. The method of claim 1, further comprising:
executing a collection of synchronization rules for synchronizing role membership within the particular security role of the particular computer application specified as the source application with role membership within a collected security role of a first destination application and role membership within a collected security role of a second destination application.

7. The method of claim 1, further comprising:
registering, by the management console, a new computer application which is to be called via the synchronization web service.

8. The method of claim 1, wherein the synchronization rules are stored as XML files.

9. A computer system comprising:
a processor configured to execute computer-executable instructions; and
memory storing computer-executable instructions for implementing a method of synchronizing role memberships within security roles of disparate computer applications, the method comprising:
interfacing, by a management console, with disparate computer applications having different established security infrastructures that support security roles for users, the management console configured to interface with the disparate computer applications via a synchronization web service;
collecting, by the management console, the security roles used in each of the disparate computer applications;
storing, at the management console, synchronization rules for associating collected security roles among the disparate computer applications;
presenting, by the management console, one or more user interfaces for selecting a particular computer application from the disparate computer applications, selecting a particular security role, selecting one or more users to be granted the particular security role, and selecting a synchronization rule that is related to the particular computer application and to the particular security role; and
executing, by the management console via the synchronization web service, a selected synchronization rule that specifies the particular computer application as a source application, specifies a destination application from the disparate computer applications, and associates the particular security role with a collected security role of the destination application;
wherein execution of the selected synchronization rule synchronizes role membership within the particular security role of the particular computer application specified as the source application and role membership within the collected security role of the destination application.

10. The computer system of claim 9, wherein the synchronization rules are stored as XML files.

11. The computer system of claim 9, wherein the method further comprises:
registering, by the management console, a new computer application which is to be called via the synchronization web service.

12. The computer system of claim 9, wherein the method further comprises:
executing a collection of synchronization rules for synchronizing role membership within the particular security role of the particular computer application specified as the source application with role membership within a collected security role of a first destination application and role membership within a collected security role of a second destination application.

13. A computer-readable storage medium storing computer executable instructions that, when executed by a computing device, cause the computing device to perform a method of synchronizing role membership within security roles of disparate computer applications, the method comprising:
interfacing, by a management console, with disparate computer applications having different established security infrastructures that support security roles for users, the management console configured to interface with the disparate computer applications via a synchronization web service;
collecting, by the management console, the security roles used in each of the disparate computer applications;
storing, at the management console, synchronization rules for associating collected security roles among the disparate computer applications;
presenting, by the management console, one or more user interfaces for selecting a particular computer application from the disparate computer applications, selecting a particular security role, selecting one or more users to be granted the particular security role, and selecting a synchronization rule that is related to the particular computer application and to the particular security role; and
executing, by the management console via the synchronization web service, a selected synchronization rule that specifies the particular computer application as a source application, specifies a destination application from the disparate computer applications, and associates the particular security role with a collected security role of the destination application;
wherein execution of the selected synchronization rule synchronizes role membership within the particular security role of the particular computer application specified as the source application and role membership within the collected security role of the destination application.

14. The computer readable storage medium of claim 13, further storing computer-executable instructions for:

obtaining, by the management console, scopes of each of the security roles used in the disparate computer applications if the different established security infrastructures of the disparate computer applications support scope specific security roles for users.

15. The computer readable storage medium of claim 13, further storing computer-executable instructions for:

displaying a directory of all users from which the one more users to be granted the particular security role are selected.

16. The computer readable storage medium of claim 13, wherein:

multiple users to be granted the particular security role are selected at the same time, and execution of the selected synchronization rule adjusts the role membership within the collected security role of the destination application to include the multiple users.

17. The computer readable storage medium of claim 13, wherein the one or more user interfaces display a list of all security roles granted to another user for selecting the particular security role.

18. The computer readable storage medium of claim 13, further storing computer-executable instructions for:

executing a collection of synchronization rules for synchronizing role membership within the particular security role of the particular computer application specified as the source application with role membership within a collected security role of a first destination application and role membership within a collected security role of a second destination application.

19. The computer readable storage medium of claim 13, further storing computer-executable instructions for:

registering, by the management console, a new computer application which is to be called via the synchronization web service.

20. The computer readable storage medium of claim 14, wherein the synchronization rules are stored as XML files.

* * * * *